(12) United States Patent
Lull et al.

(10) Patent No.: US 11,635,051 B2
(45) Date of Patent: Apr. 25, 2023

(54) CO-AXIAL DUAL FLUIDS METERING SYSTEM AND METHODS

(71) Applicant: ENGINETICS, LLC, Miami Beach, FL (US)

(72) Inventors: Joseph Lull, South Haven, MI (US); Justin Warner, Milford, MI (US)

(73) Assignee: Enginetics, LLC, Miami, FL (US)

( * ) Notice: Subject to any disclaimer, the term of this patent is extended or adjusted under 35 U.S.C. 154(b) by 525 days.

(21) Appl. No.: 16/420,970

(22) Filed: May 23, 2019

(65) Prior Publication Data

US 2019/0309718 A1 Oct. 10, 2019

Related U.S. Application Data

(63) Continuation of application No. 13/857,689, filed on Apr. 5, 2013, now Pat. No. 10,302,058.

(51) Int. Cl.
| | |
|---|---|
| *F02M 61/16* | (2006.01) |
| *F02M 51/06* | (2006.01) |
| *F02M 21/02* | (2006.01) |
| *F02M 69/04* | (2006.01) |
| *F02M 67/12* | (2006.01) |

(52) U.S. Cl.
CPC ........ *F02M 61/162* (2013.01); *F02M 21/026* (2013.01); *F02M 21/0254* (2013.01); *F02M 21/0278* (2013.01); *F02M 51/0617* (2013.01); *F02M 51/0682* (2013.01); *F02M 67/12* (2013.01); *F02M 69/047* (2013.01); *Y02T 10/30* (2013.01)

(58) Field of Classification Search
CPC ............. F02M 61/162; F02M 21/0254; F02M 21/026; F02M 21/0278; F02M 51/0617; F02M 51/0682; F02M 21/042
See application file for complete search history.

(56) References Cited

U.S. PATENT DOCUMENTS

| | | |
|---|---|---|
| 2,693,311 A | 11/1954 | Kratzer |
| 2,867,375 A | 1/1959 | Petersen |
| (Continued) | | |

FOREIGN PATENT DOCUMENTS

WO 2011041890 A1 4/2011

OTHER PUBLICATIONS

Wall, John, Microprocessor Clutch Controller and Electro Rheological Clutch, Dec. 2, 1988, (5 pp.).

(Continued)

*Primary Examiner* — Christopher R Dandridge
(74) *Attorney, Agent, or Firm* — Blank Rome LLP

(57) ABSTRACT

A metering system for a fuel atomizer includes a housing having a fuel inlet and an oxidizer inlet arranged coaxially, and an oxidizer metering device having a plurality of oxidizer channels, an oxidizer flow controller, and a fuel metering device. The oxidizer channels are spaced apart circumferentially in the housing and are arranged angled in at least one of a radially inward direction and a tangential direction to create a swirl of oxidizer flow in a mixing chamber of the fuel atomizer. The oxidizer flow controller is configured to control flow of oxidizer from the oxidizer inlet to the plurality of oxidizer channels. The fuel metering device is configured to control fuel flow from the fuel inlet to the mixing chamber.

16 Claims, 14 Drawing Sheets

(56) References Cited

U.S. PATENT DOCUMENTS

| | | |
|---|---|---|
| 3,907,207 A | 9/1975 | O'Brien |
| 3,929,290 A | 12/1975 | Tallarovic |
| 3,963,379 A | 6/1976 | Ueno |
| 4,020,803 A * | 5/1977 | Thuren .............. F02M 51/0657 |
| | | 123/90.11 |
| 4,195,779 A | 4/1980 | Auclair et al. |
| 4,828,181 A | 5/1989 | Singels-Craenen |
| 4,982,716 A | 1/1991 | Takeda et al. |
| 5,035,358 A | 7/1991 | Katsuno et al. |
| 5,224,450 A | 7/1993 | Paul et al. |
| 5,301,879 A | 4/1994 | Takeda et al. |
| 5,360,166 A | 11/1994 | Nogi et al. |
| 5,518,182 A | 5/1996 | Sasao |
| 5,526,796 A * | 6/1996 | Thring ................. F02M 51/061 |
| | | 239/408 |
| 5,997,259 A | 12/1999 | Marshall et al. |
| 6,039,029 A | 3/2000 | Nagasaka et al. |
| 6,065,691 A | 5/2000 | West |
| 6,174,160 B1 | 1/2001 | Lee et al. |
| 6,205,983 B1 | 3/2001 | Egizi |
| 6,209,806 B1 | 4/2001 | Pace et al. |
| 6,328,222 B1 | 12/2001 | Warner et al. |
| 6,561,167 B2 | 5/2003 | Berndt |
| 6,752,131 B2 * | 6/2004 | Poola ..................... F02M 23/04 |
| | | 123/533 |
| 7,036,753 B2 | 5/2006 | Huffman |
| 7,104,477 B2 | 9/2006 | Kilgore et al. |
| 11,073,121 B2 * | 7/2021 | Huettner .............. F02M 51/061 |
| 2005/0271992 A1 | 12/2005 | DeGrazia, Jr. et al. |
| 2006/0169800 A1 | 8/2006 | Rosell et al. |
| 2011/0284652 A1 * | 11/2011 | Amaya ................... F23D 11/24 |
| | | 239/71 |
| 2013/0175365 A1 | 7/2013 | Ergut et al. |

OTHER PUBLICATIONS

Bullough, W.A., et al., The Electro-Rheological Clutch: Design Performance Characteristics and Operation, Proceedings of the Institution of Mechanical Engineers, Part I: Journal of Systems and Control Engineering, May 193, 207:87-95, (9 pp.).

Johnson, A.R., et al., Fluid Durability in a High Speed Electro-Rheological Clutch, Journal of Intelligent Material Systems and Structures, vol. 4 (4):527-532 SAGE—Oct. 1, 1993 (6 pp.).

PCT International Search Report for International Application No. PCT/US2014/032881, dated Aug. 20, 2014 (2 pp.).

* cited by examiner

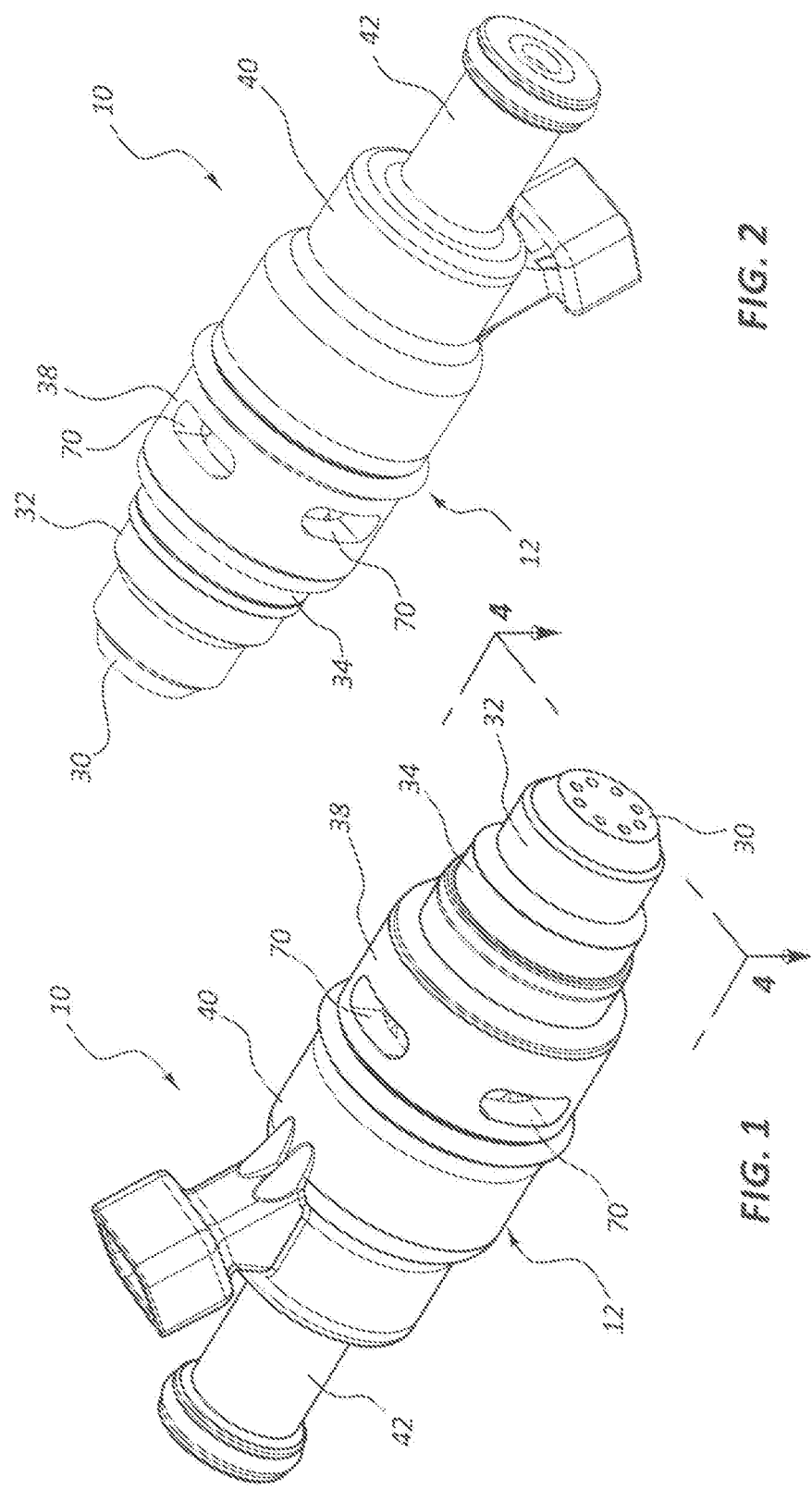

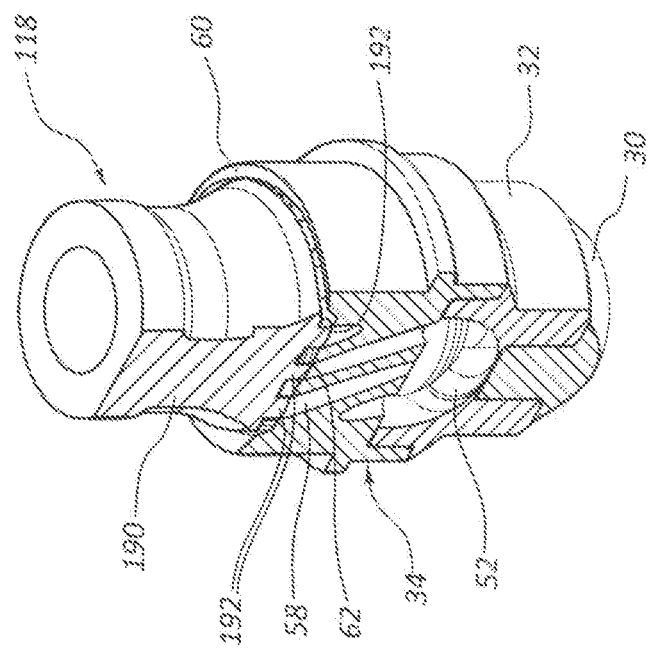
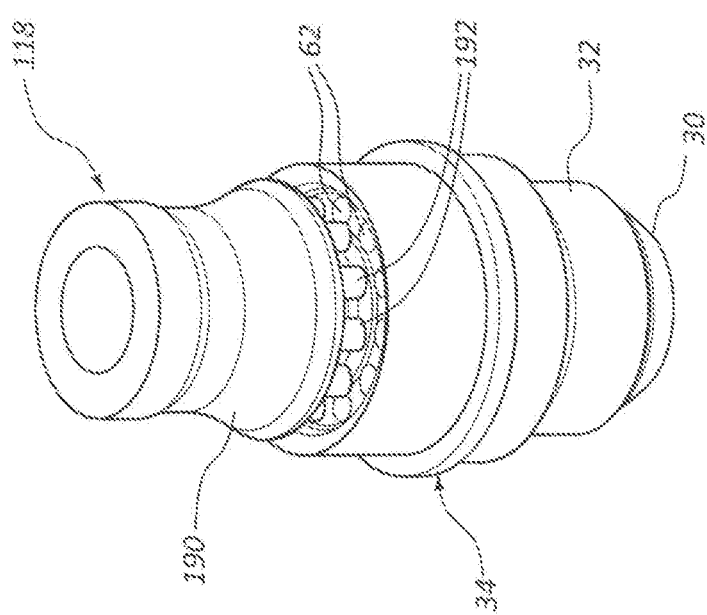
FIG. 7B
FIG. 7A

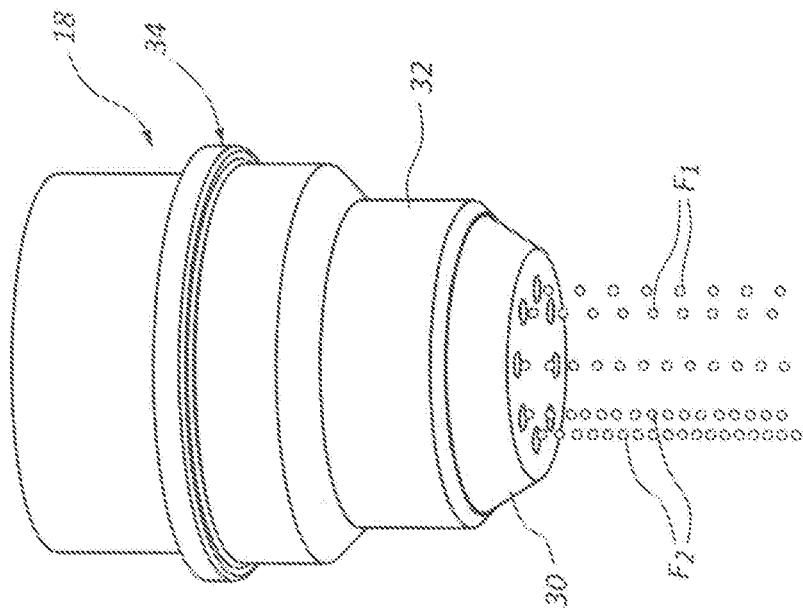
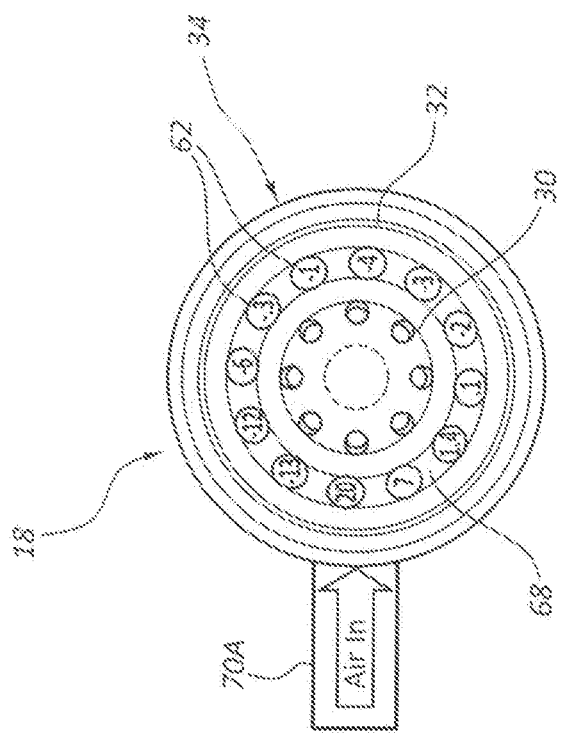
FIG. 8B
FIG. 8A

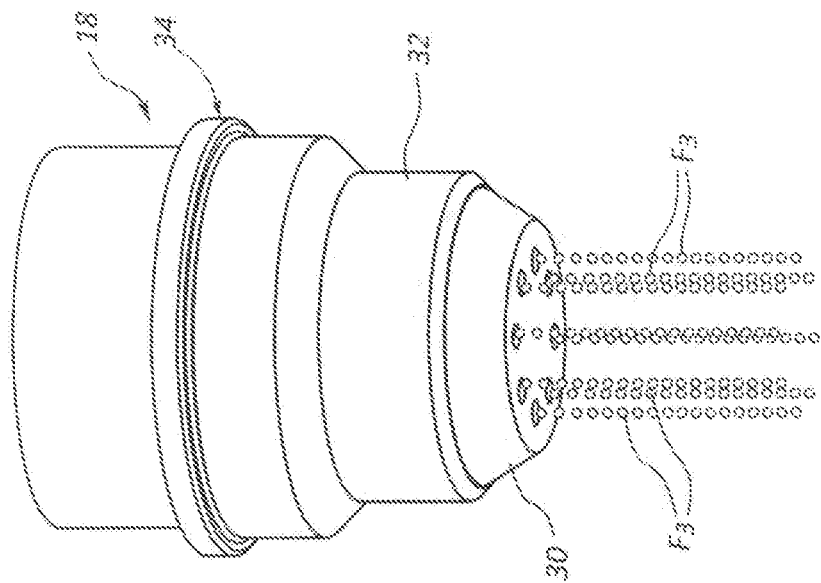
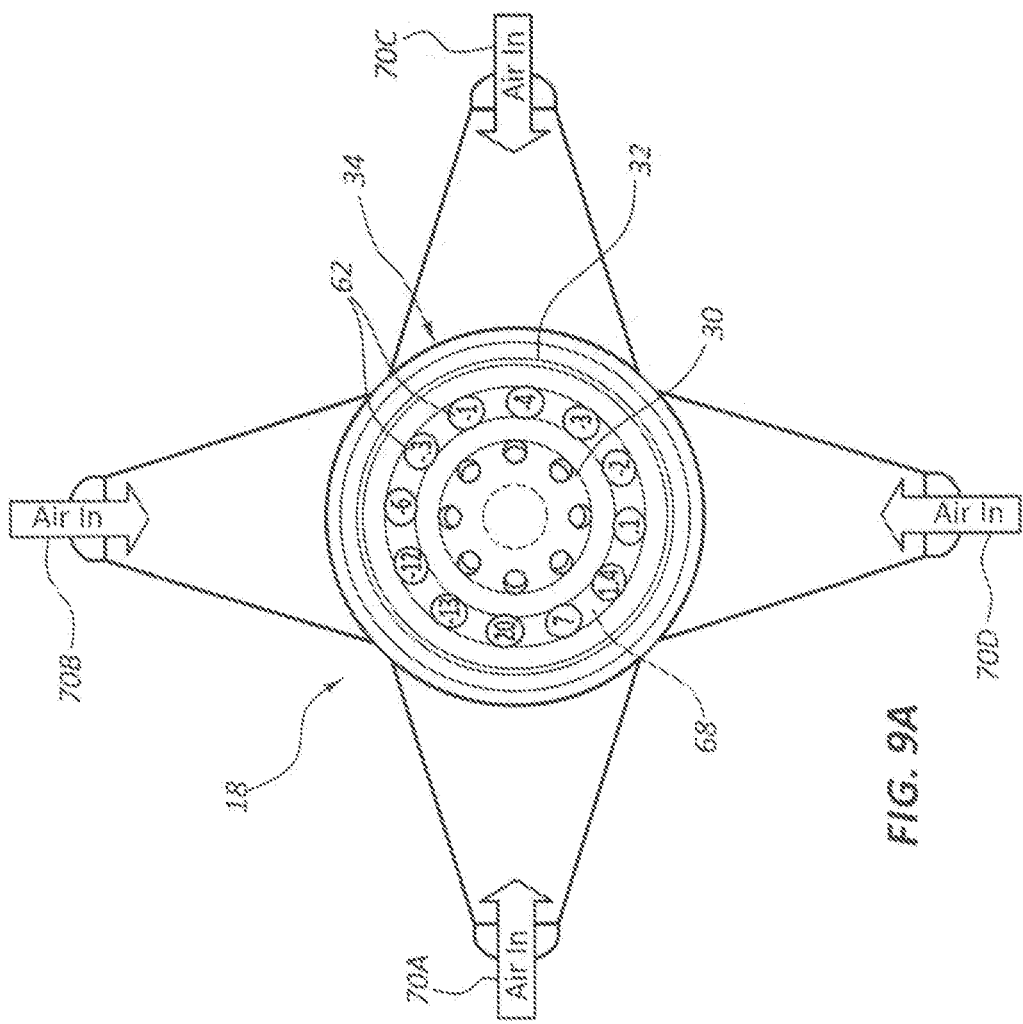

CO-AXIAL DUAL FLUIDS METERING SYSTEM AND METHODS

RELATED APPLICATIONS

This application is a continuation of U.S. patent application Ser. No. 13/857,689, filed on 5 Apr. 2013 and entitled CO-AXIAL DUAL FLUIDS METERING SYSTEM AND METHODS, pending, the disclosure of which is incorporated in its entirety by this reference.

TECHNICAL FIELD

The present disclosure is directed to fuel systems, and more particularly directed to metering of fuel delivery systems having multiple stages to enhance evaporation of the fuel.

BACKGROUND

Many types of devices have been developed over the years for the purpose of converting liquids into aerosols or fine droplets readily converted into a gas-phase. Many such devices have been developed, for example, to prepare fuel for use in internal combustion engines. To optimize fuel oxidation within an engine's combustion chamber, the fuel must be vaporized, homogenized with air, and in a chemically-stoichiometric gas-phase mixture. Ideal fuel atomization and vaporization enables more complete combustion and consequent lower engine out pollution.

More specifically, relative to internal combustion engines, stoichiometry is a condition where the amount of oxygen required to completely burn a given amount of fuel is supplied in a homogeneous mixture resulting in optimally correct combustion with no residues remaining from incomplete or inefficient oxidation. Ideally, the fuel should be completely vaporized, intermixed with air, and homogenized prior to ignition for proper oxidation. Non-vaporized fuel droplets do not ignite or combust completely in conventional internal and external combustion engines, which degrades fuel efficiency and increases engine out pollution.

Attempts to reduce or control emission byproducts by adjusting temperature and pressure typically affects the $NO_x$ byproduct. To meet emission standards, these residues must be dealt with, typically requiring after treatment in a catalytic converter or a scrubber. Such treatment of these residues results in additional fuel costs to operate the catalytic converter or scrubber and may require additional component costs as well as packaging and mass implications. Accordingly, any reduction in engine out residuals resulting from incomplete combustion would be economically and environmentally beneficial.

An engine running a closed loop in which $\lambda=1$ (e.g., when $\lambda$ equals the ratio of air/fuel ratio (AFR) divided by the stoichiometric air/fuel ratio ($AFR_{stoich}$) is targeted will typically be operating at or near stoichiometery. If the fuel is not completely vaporized, the engine management system (EMS) will add extra fuel to ensure that stoichiometery is reached as the oxygen sensor is monitoring excess oxygen in the exhaust. A reduction in efficiency caused by fuel not being completely vaporized results from extra fuel being added to ensure stoichiometery is achieved. Fuel energy is wasted and unnecessary pollution is created when the fuel is not completely vaporized. Thus, by further breaking down and more completely vaporizing the fuel-air mixture, better fuel efficiency may be available.

Many attempts have been made to alleviate the above-described problems with respect to fuel vaporization and incomplete fuel combustion. In automobile engines, for example, inlet port or direct fuel injection has almost universally replaced carburetion for fuel delivery. Fuel injectors spray fuel directly into the inlet port or cylinder of the engine and are controlled electronically. Injectors facilitate more precise metering and control of the amount of fuel delivered to each cylinder independently relative to carburetion. This reduces or eliminates charge transport time facilitating optimal transient operation. Nevertheless, the fuel droplet size of a fuel injector spray is not optimal and there is little time for the fuel to mix with air prior to ignition.

Some types of fuel delivery systems require a source of compressed air to properly delivery fuel to the cylinder for combustion. The compressed air it typically provided by the engine or a compressor component operated by the engine.

A number of challenges exist for implementing fuel delivery systems within the IC engine. For example, space on engines is typically in high demand and there is limited space available on the engine for mounting large pieces. Therefore, there is a need for concise packaging of a fuel delivery system. Further, performance of the engine may be influenced by the distance fluids from the fuel delivery system are required to travel to reach the combustion chamber. Still further, the way in which fuel and oxidizer are routed to and delivered through the fuel delivery system may create uneven distribution of flow through the fuel delivery system and consequently create non-uniform delivery of fuel to the combustion chamber. Other challenges exist related to the amount of energy required to operate the fuel delivery system and the undesirable creation of pressure drops for fluids passing through the fuel delivery system.

Opportunities exist for improving fuel delivery systems for engines.

SUMMARY

The principles described herein may address some of the above-described deficiencies and others. Specifically, some of the principles described herein relate to liquid processor apparatuses and methods.

One aspect provides a metering system for a fuel atomizer. The metering system includes a housing and an oxidizer metering device. The housing includes a fuel inlet and an oxidizer inlet arranged coaxially. The oxidizer metering device includes a plurality of oxidizer channels, a oxidizer flow controller, and a fuel metering device. The oxidizer channels are spaced apart circumferentially in the housing and are arranged angled in at least one of a radially inward direction and a tangential direction to create a swirl of oxidizer flow in a mixing chamber of the fuel atomizer. The oxidizer flow controller is configured to control flow of oxidizer from the oxidizer inlet to the plurality of oxidizer channels. The fuel metering device is configured to control fuel flow from the fuel inlet to the mixing chamber.

The oxidizer flow controller may include a solenoid actuated member that moves axially between a closed position sealing the plurality of oxidizer channels and an open position providing flow communication between the oxidizer inlet and the plurality of oxidizer channels. The oxidizer flow controller may include a plurality of pins that move axially between a closed position sealing the plurality of oxidizer channels and an open position providing flow communication between the oxidizer inlet and the plurality of oxidizer channels.

The fuel metering device may include a solenoid valve. The fuel metering device and oxidizer metering device may be arranged coaxially. The fuel metering device may be positioned radially inward from the oxidizer metering device. The oxidizer channels are angled radially inward at an angle relative to a longitudinal axis of the metering system. The oxidizer channels may be angled tangentially relative to a longitudinal axis of the metering system. The plurality of oxidizer channels may include at least 10 oxidizer channels.

Another aspect of the present disclosure relates to a method of metering oxidizer and fuel for a fuel atomizer. The method includes providing a mixing chamber, a nozzle, an oxidizer metering device and a fuel metering device, wherein the oxidizer metering device includes a plurality of oxidizer channels and the oxidizer metering device is arranged co-axially with the fuel metering device. The method also includes controlling oxidizer flow through the plurality of oxidizer channels to the mixing chamber to create a flow of oxidizer into the mixing chamber, controlling fuel flow to the mixing chamber with the fuel metering device to create a mixture of oxidizer and fuel in the mixing chamber, and delivering the mixture out of the nozzle.

The oxidizer metering device may include a solenoid actuated member, and controlling oxidizer flow may include moving the solenoid actuated member axially relative to the plurality of oxidizer channels. The oxidizer metering device may include a plurality of pins arranged adjacent to the oxidizer channels, and controlling oxidizer flow may include operating the plurality of pins relative to the plurality of oxidizer channels. The fuel metering device may include a solenoid valve, and controlling fuel flow may include operating the solenoid valve. The oxidizer channels may be arranged circumferentially spaced apart. The oxidizer channels may be angled in at least one of a radial direction and a tangential direction.

A further aspect of the present disclosure relates to a pre-combustion fuel mixing device, which includes a pre-combustion mixing chamber and first and second fluid metering devices. The first fluid metering device is configured to deliver a first fluid to the pre-combustion mixing chamber. The second fluid metering device is arranged coaxially with the first fluid metering device and configured to deliver a second fluid to the pre-combustion mixing chamber. The second fluid metering device includes an inlet fluid chamber arranged radially outward from the first fluid metering device, a plurality of circumferentially spaced apart channels extending from the inlet fluid chamber to the pre-combustion mixing chamber, and at least two supply ducts providing flow of the second fluid to the inlet fluid chamber.

The plurality of circumferentially spaced apart channels may be angled radially inward. The plurality of circumferentially spaced apart channels may be arranged at a tangential angle. The second fluid metering device may include at least one valve member positioned in the inlet fluid chamber to control flow of the second fluid into the plurality of circumferentially spaced apart channels. The at least two supply ducts may include at least four supply ducts arranged at equally spaced apart circumferential locations.

BRIEF DESCRIPTION OF THE DRAWINGS

The accompanying drawings illustrate certain embodiments discussed below and are a part of the specification.

FIG. 1 is a perspective view of an example fuel delivery device in accordance with the present disclosure.

FIG. 2 is another perspective view of the fuel delivery device of FIG. 1.

FIG. 7A is a perspective view of flow control components of another example fuel delivery device in accordance with the present disclosure in an open position.

FIG. 7B shows the components of FIG. 7A in a closed position.

FIG. 8A shows an end view of distal components of the fuel delivery device with a single air inlet.

FIG. 8B shows resulting variable output flow with the single inlet arrangement of FIG. 8A.

FIG. 9A shows an end view of distal components of the fuel delivery device of FIG. 1 with a plurality of air inlets.

FIG. 9B shows the even flow output resulting from the air inlet arrangement of FIG. 9A.

Throughout the drawings, identical reference characters and descriptions indicate similar, but not necessarily identical elements.

DETAILED DESCRIPTION

Figure 3A:
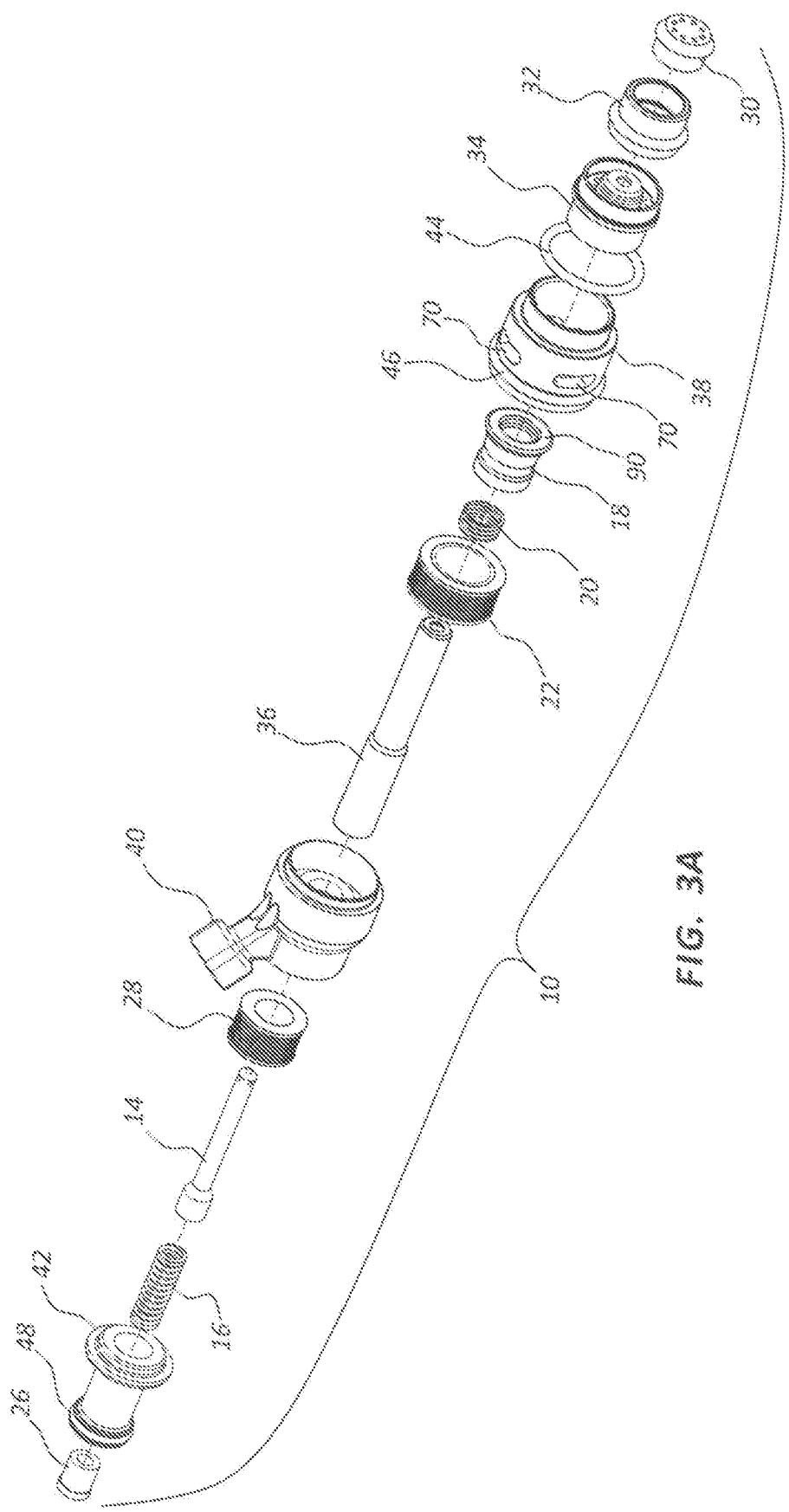
FIG. 3A is an exploded perspective view of the fuel delivery device of FIG. 1.
Figure 3B:
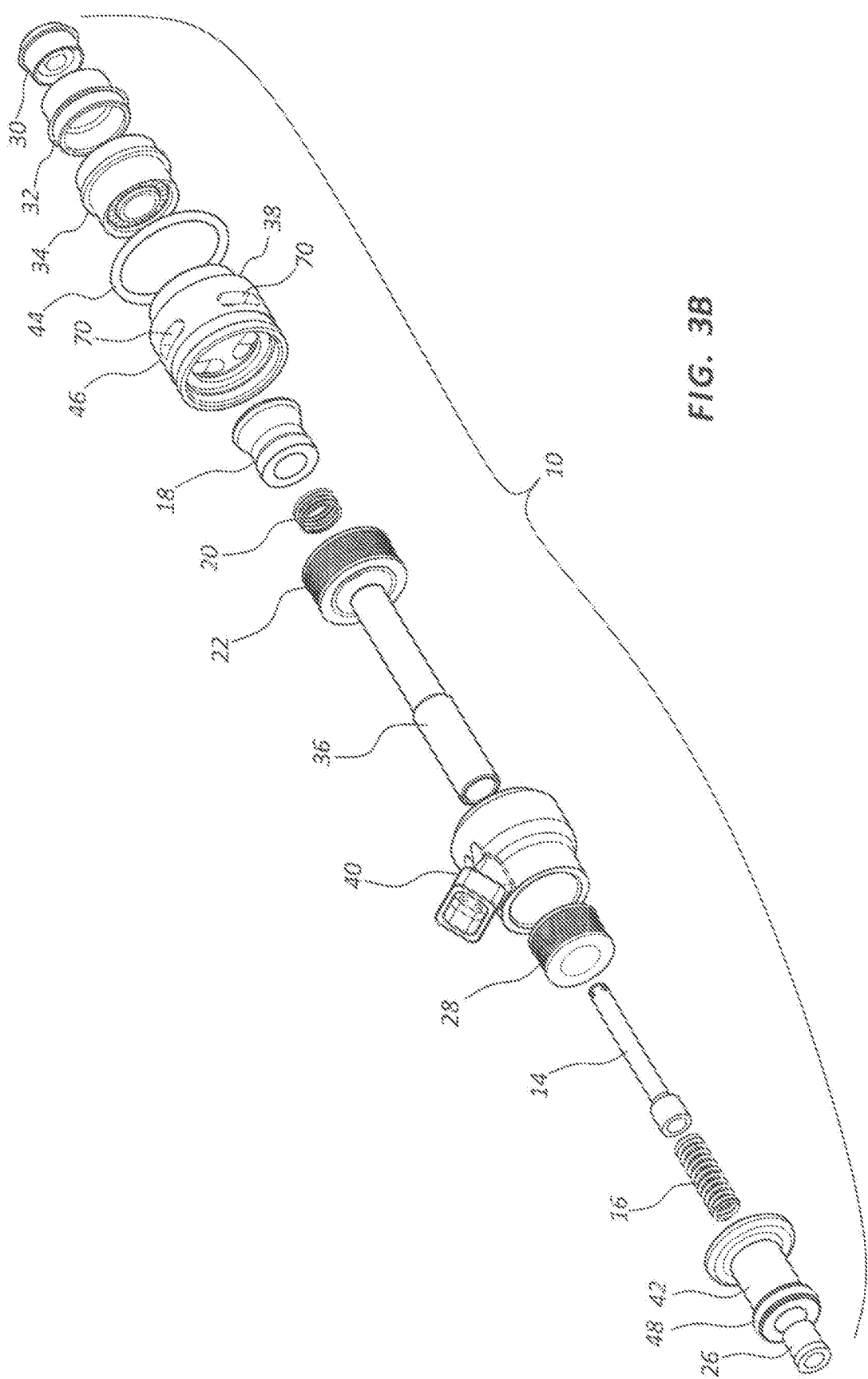
FIG. 3B is another exploded perspective view of the fuel delivery device of FIG. 1.
Figure 4:
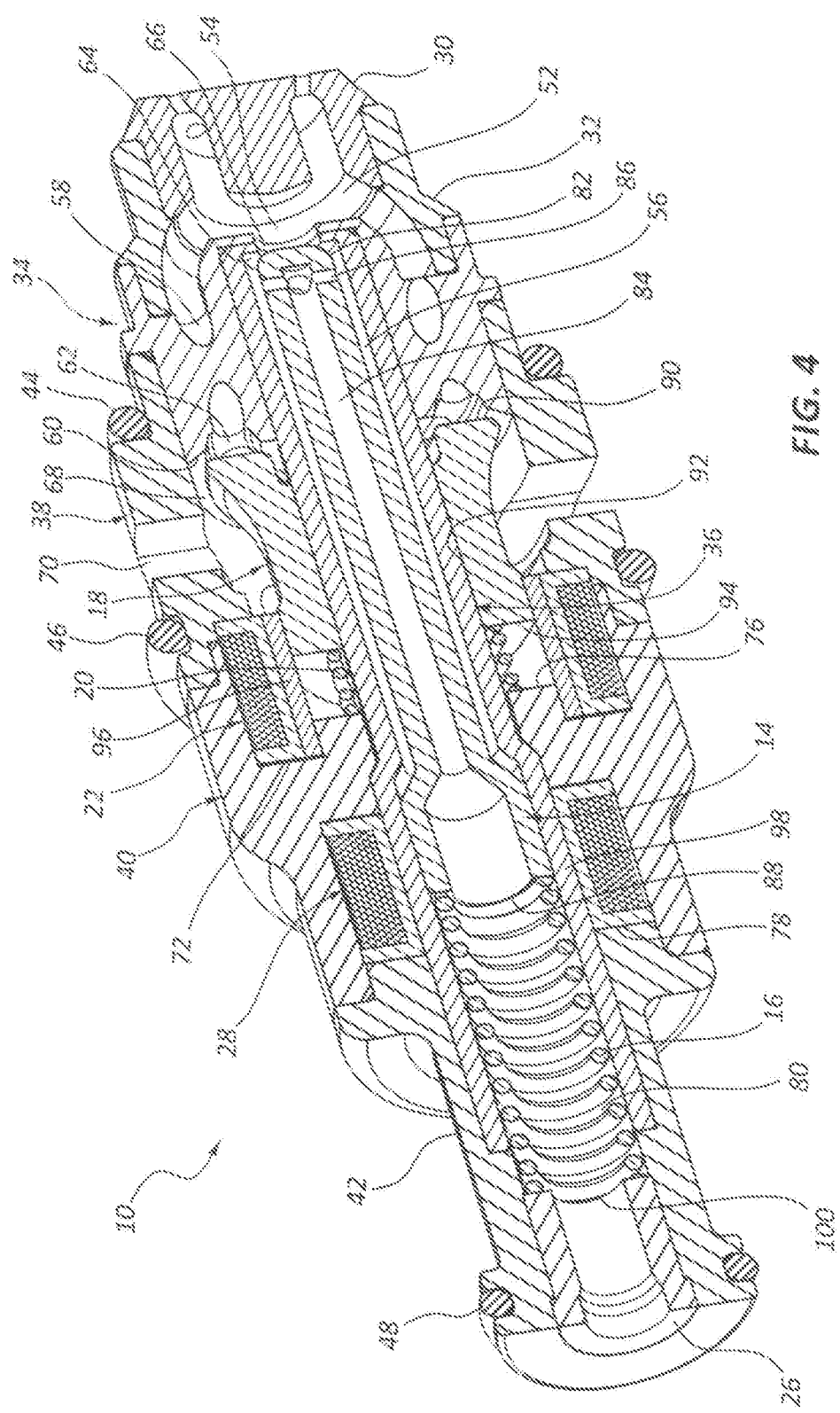
FIG. 4 is a cross-sectional view of the fuel delivery device of FIG. 1 taken along cross-section indicators 4-4.

Illustrative embodiments and aspects are described below. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure is generally directed to fuel delivery systems, and more particularly relates to dual fluids delivery systems. The fuel delivery system, devices and methods disclosed herein provide balanced, equalized pressure and flow while providing improved precision in supplying the amount of fluid released through the fuel delivery device for each discharge of fuel.

Dual fluids metering and spray systems require unique fluid handling to deliver fluids efficiently, without significant energy loss, and effectively to provide balanced and uniform distribution. Balanced and uniform distribution facilitates homogenous internal mixing and unbiased, evenly distributed spray delivery at the nozzle. Balanced and uniform distribution is achieved through coaxial introduction and transport of fluids as provided by an optimized geometry and packaging, which is embodied in the examples disclosed herein.

The devices and systems described herein provide two metering solenoids arranged coaxially with an inline or radial configuration. The central solenoid metering valve is generally intended for liquid fluids (e.g., fuel) and the outer solenoid metering valve is generally intended for gaseous fluids (e.g., air or gas). One fluid is typically a propellant or a liquid, and the other fluid is typically an oxidant or gas (e.g., air or inert gas). The term oxidant as used herein may be interchangeable with the terms air or gas.

The central solenoid actuates to release fuel into a multi-physics atomizer portion of the fuel delivery device, which may also be referred to generally as a mixing chamber. The outer solenoid actuates to open a plurality of radially spaced apart air inlet holes, which provide a flow of oxidizing gas (e.g., air) through the air inlet channels into the mixing chamber to mix with the fuel. The solenoids may be electrically connected to a connector via, for example, a single connector with power supply and excitation pins for both solenoids. Alternatively, the solenoids may be electrically connected to a controller via separate connectors associated with each solenoid.

While the two fluids controlled through the fuel delivery device typically are a gas and liquid, other combinations such as gas/gas and liquid/liquid are possible. Internal to the fuel delivery device, the gas may physically interact with the liquid to provide initial breakup and to drive the liquid through the outlet holes for final breakup into the smallest possible particle size. The mixture of fuel and gas are introduced to the engine via an intake port. Equally distributed flow within the mixing chamber of the fuel delivery device may be important for producing balance, homogenous mixing as well as an unbiased delivery through the plurality of outlet holes formed in a nozzle at a distal end of the fuel delivery device. The fuel delivery devices disclosed herein may provide equal distribution for physical introduction of the gas into an air inlet chamber, which is positioned upstream of the air inlet channels, using at least two air supply ducts. The at least two air supply ducts influence how air travels through the air inlet channels and into the mixing chamber. The number of air supply ducts and the arrangement of air inlet channels coaxial with the fuel delivery into the mixing chamber may facilitate uniform distribution of droplets in the resulting spray plume formed as the fuel and air mixture is ejected through the nozzle.

Another aspect of the present disclosure relates to the two fluids being individually metered through the fuel delivery device for mixing and atomizing. The liquid component may be injected into the mixing chamber directly onto a centrally fixed pedestal. Initial breakup of the liquid occurs here and mixing with the gaseous component, which is introduced into the mixing chamber via a plurality of coaxially, radially arranged air inlet channels. The air inlet channels may be arranged for straight (e.g., axial) introduction of gaseous component in the mixing chamber. Alternatively, the air inlet channels may be arranged at an incline or angle, in either or both of a circumferentially angled direction (also referred to as a tangential direction) and a radially angled direction. The angled orientation of the air inlet channels (also referred to as oxidizer or gas channels) may produce a vortex flow in the mixing chamber. The air flow through each of the air inlet channels is preferably approximately the same speed, pressure and mass flow rate in order to provide optimized mixing within the mixing chamber and production of a even spray distribution out of the fuel delivery device nozzle. In order to achieve this consistent flow through the air channels, the air supply at the entrance to each air inlet channel may be provided with a volume of air that has substantially the same speed, pressure and mass flow rate.

The coaxial arrangement of the gaseous fluid entry into the air inlet chamber, through the air inlet channels and into the mixing chamber of the fuel delivery device may provide improved balance and equalization of pressure and flow, thereby resulting in a more homogenous mixture in the mixing chamber. The homogenous mixture may facilitate some of the droplet breakup mechanisms within the mixing chamber and as the fuel air mixture exits via a nozzle of the fuel delivery device. Additionally, equalized pressure and flow of the air may facilitate improved cleanout of the mixing chamber in pre- and post-liquid (e.g., fuel) metering events. Further, the equalized distribution into and through the mixing chamber may provide improved unbiased flow at the nozzle outlet holes, thereby facilitating a more uniform spray plume as discussed above.

Referring now to FIGS. 1-4, an example fuel delivery device 10 having the oxidizer flow control described above is shown and described. The fuel delivery device includes a housing assembly 12, a fuel plunger 14, a fuel spring 16, an air plunger 18, an air spring 20, a first solenoid 22, a fuel filter 26, and a second solenoid 28. The first solenoid 22 operates with the air spring 20 to move the air plunger 18 between open and closed positions. The second solenoid 28 operates with the fuel spring 16 to move the fuel plunger 14 between open and closed positions. The first solenoid 22 includes a bore 96 within which at least the air plunger 18 extends. The second solenoid 28 includes a bore 98 within which at least the fuel plunger 14 extends. The fuel filter 26 includes a distal surface 100 against which a proximal surface of the air spring 20 contacts as will be described in further detail below.

The housing assembly 12 is described with reference to FIGS. 11 and 12A. The housing assembly 12 includes a delivery tip 30 (also referred to as a nozzle), a lower mix housing 32, an upper mix housing 34, a fuel inner housing 36, an air housing 38, a solenoid housing 40, and a cover housing 42. The housing assembly 12 also includes first, second and third o-rings 44, 46, 48.

The delivery tip 30 includes a mixing chamber 52. The upper mix housing 34 includes a fuel aperture 54, a fuel cavity 56, a plurality of air channels 58, an air sealing seat 60, and an air aperture 62. The fuel inner housing 36 includes a plunger seat 64 and a fuel aperture 66. The air housing 38 includes an air cavity 68 and a plurality of air inlets 70. The solenoid housing 40 includes a first solenoid seat 72, an air spring seat 76, and a second solenoid seat 78. The cover housing 42 includes a bore 80 sized to receive the fuel filter 26.

The fuel plunger 14 includes a distal sealing surface 82, an axial fuel channel 84, a lateral fuel channel 86 and a spring seat 88. The air plunger 18 includes a distal sealing surface 90, a plunger bore 92, and a proximal surface 94. The air plunger 18 may be referred to as a valve member.

The distal sealing surface 82 of the fuel plunger 14 is arranged to contact the plunger seat 64 of the fuel inner housing 36 and to control fluid flow from a fuel cavity 56 within the fuel inner housing 36 into the mixing chamber 52. The distal sealing surface 90 of the air plunger 18 is arranged to contact the air sealing seat 60 of the upper mix housing 34 to control airflow from the air cavity 68 into the mixing chamber 52. The fuel inner housing 36 and fuel plunger 14 move axially in a direction independent of axial movement of the air plunger 18. This independent movement may make it possible to move the fuel plunger 14 and air plunger 18 in any desired sequence to control the flow of air and fuel into the mixing chamber 52. Further, the independent control provided by the embodiment of FIGS. 1-4 may make it easier to control the delays between opening and closing the fuel plunger 14 and air plunger 18. The air plunger 18 of fuel delivery device 10 may require exchange of the fuel and air springs or changing the fuel and air pressures in order to change the delay between the opening and closing of each of the fuel and air plungers.

Various bulk air supplied geometries may provide control of air flow from the air cavity 68 into the air aperture 62. Air may be delivered into the air cavity 68 using, for example, at least one channel, a manifold, a rail, or similar common supply that delivers air through the air inlet into the air cavity 68. In some arrangements, the air may be delivered to the air cavity 68 using a plurality of channels as will be discussed in further detail below.

The air plunger 18 (also referred to as an oxidizer flow controller) may be operable to provide concurrently a substantially uniform flow of compressed air to each of the air apertures 62. Air enters the air cavity 68 via the air inlets 70. The air is supplied via, for example, a channel, manifold or rail. The air may deadhead at an opposite side of the air cavity 68 (e.g., against an outer surface of the air plunger 18). The air fills the air cavity 68 with an equalized pressure. Moving the air plunger 18 away from the air sealing seat 60 of the upper mix housing 34 exposes the air apertures 62 to the supply of equalized pressure air.

Figure 5B:
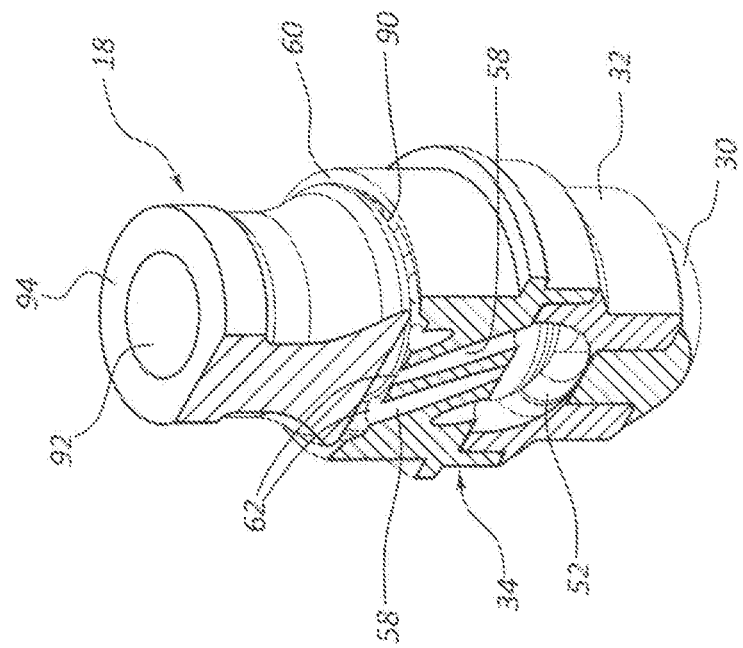
FIG. 5B is a partial cutaway view of the components shown in FIG. 5A.
Figure 5A:
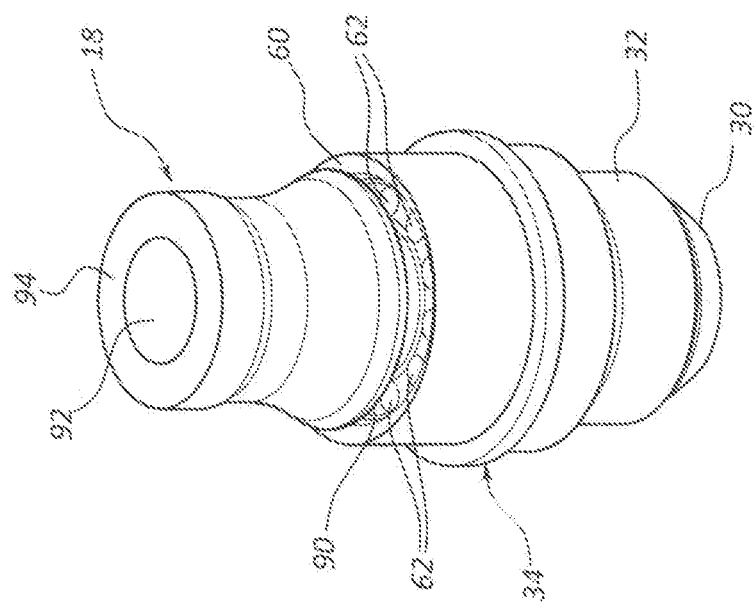
FIG. 5A is a perspective view of air flow components of the fuel delivery device of FIG. 1 in an open position.

FIG. 5A shows the air plunger 18 moved axially away from the upper mix housing 34 such that the distal sealing surface 90 of the air plunger 18 is spaced apart from the air sealing seat 60 to permit exposure of the air aperture 62 to the supply of equalized pressure air. FIG. 5B shows a partial cutaway view of the assembly shown in FIG. 5A. The air aperture 62, when exposed to the pressurized air in the air cavity 68, provides a flow path for air to travel into the mixing chamber 52. FIG. 5B also shows the angled orientation of the air channels from the air aperture 62 to the mixing chamber 52. The air channel 58 may be angled circumferentially moving from the air aperture 62 to the mixing chamber 52. In at least some arrangements, the air channel 58 may be angled radially inward or radially outward from the air aperture 62 to the mixing chamber 52. The air channels 58 may be angled in both circumferential and radial directions.

Figure 6B:
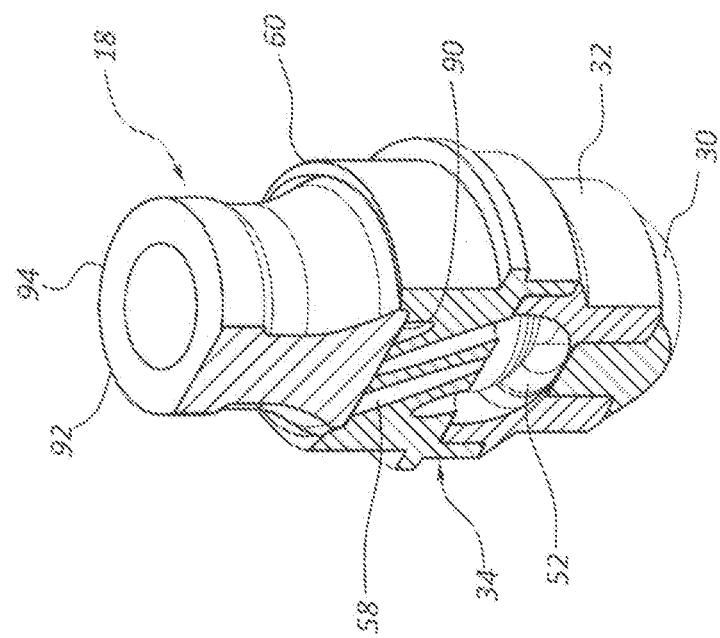
FIG. 6B is a partial cutaway view of the components of FIG. 6A.
Figure 6A:
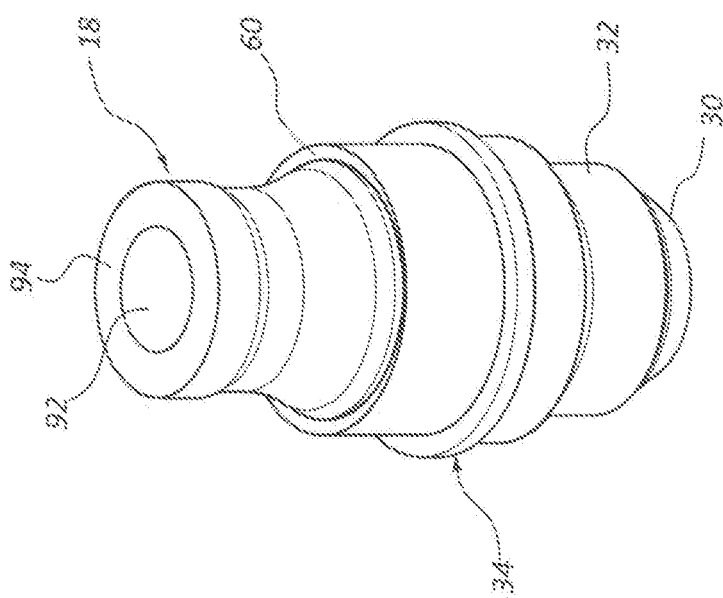
FIG. 6A is a perspective view of the flow of the air control components of FIG. 5A in a closed position.

FIG. 6A shows the air plunger 18 advanced axially to contact the distal sealing surface 90 against the air sealing seat 60. This orientation of the air plunger 18 seals the air aperture 62 from the source of equalized pressure air held in the air cavity 68. FIG. 6B shows a partial cutaway view of the arrangement of FIG. 6A showing the interface between the distal sealing surface 90 and the air sealing seat 60.

FIGS. 7A and 7B show an alternative embodiment for control of air flow into the air aperture 62. FIG. 7A shows an air plunger 118 comprising a housing 190 having a plurality of pintles 192 mounted thereto. The pintles 192 (also referred to as pins 192) are arranged in alignment with each of the air apertures 62. The pintles 192 provide individual control of air flow into the air aperture 62 and consequently through the air channel 58 to the mixing chamber 52.

In operation, the air plunger 118 moves axially away from the upper mix housing 32 to expose the air apertures 62 to a volume of equalized pressure air held in the air cavity 68 (see FIG. 7A). Air flow into the mixing chamber 52 is stopped by advancing the air plunger 118 to seat the pintles 192 in sealing engagement with the air apertures 62 as shown in FIG. 7B.

When a fluid (e.g., gas) enters into the air cavity 68 upstream of the air channels 58, it is important that the mass flow of the fluid is evenly distributed across the face of the air apertures 62. Fluid metered externally and entering in at only one side of the air cavity 68 typically biases the output into the air aperture 62 to one side of the fuel delivery device 10.

FIG. 8A shows an end view of the assembly of FIG. 5A with the air plunger 18 removed and only a single air inlet 70A into the air cavity 68. The reference numbers in each of the air aperture 62 provides an example of the flow variants from an average value. The variation in the number in each air aperture 62 shows the substantial bias in mass flow induced when only a single air inlet 70A is used. This mass flow bias may exhibit itself in a spray plume density variation or variations in droplet size (e.g., Saunter mean diameter (SMD)) and distribution of the spray plume. Consequently, the overall performance of the fuel delivery device may be negatively influenced when using only a single air inlet 70A.

FIG. 8B shows output from the delivery tip 30 when using a single air inlet 70A. The output includes some streams having a lower flow rate $F_1$ than the flow rate $F_2$ at other outlets of the delivery tip 30.

FIG. 9A shows the use of a plurality of air inlets 70A-70D into the air cavity 68 to which the air apertures 62 are exposed. The reference numbers shown in the air aperture 62 represent a flow variance from average value. A comparison of FIGS. 8A and 9A show that the variation is significantly reduced among all of the air aperture 62 when a plurality of air inlet 70A-70D are used. FIG. 9B shows the output at delivery tip 30 as a result of the plurality of air inlets 70A-70D. The output shown in FIG. 9B includes a consistent or even flow $F_3$ at all or substantially all of the outlets of delivery tip 30.

The use of a plurality of air inlets into the air cavity 68 may provide a more robust approach as compared to a single air inlet, particularly when using a supply bulk such as the air plunger 18, which concurrently exposes all of the air apertures 62 to an equalized pressure air supply. The arrangement of fuel delivery device 10, which is at least in part represented by the schematic illustration of FIG. 9A, may provide bulk air supply to the fuel delivery device 10 and use a single solenoid to expose all of the air aperture 62 as if they were exposed directly to a bulk air chamber, channel or rail to provide air flow through the air inlets 70 to the air cavity 68. Supplying metered air to the air cavity 68 at two or more points may provide an improved equalization of mass flow into the air apertures 62 to insure a more balanced mass flow through the air channel 58 to the mixing chamber 52. Multiple metered supply points may be added to further balance flow into the air cavity 68.

Referring again to FIGS. 1 and 2, the air inlet 70 in the air housing 38 may be equally spaced apart around a periphery of the air housing 38. Typically, the air inlets 70 are arranged in pairs at 180° spacing around the periphery of the air housing 38. The number of air inlets 70 is typically an even number. However, different numbers and arrangements are possible for the air inlet 70 in other embodiments.

The examples shown with reference to FIGS. 6A-7B operate to provide control of air flow through air aperture 62 using linear motion in an axial direction. Other devices are possible with different types of motion including, for example, sliding motion in a direction perpendicular to a longitudinal axis of the fuel delivery device 10, and rotational motion of, for example, the air plunger 18 relative to the upper mix housing 34.

Figure 10A:
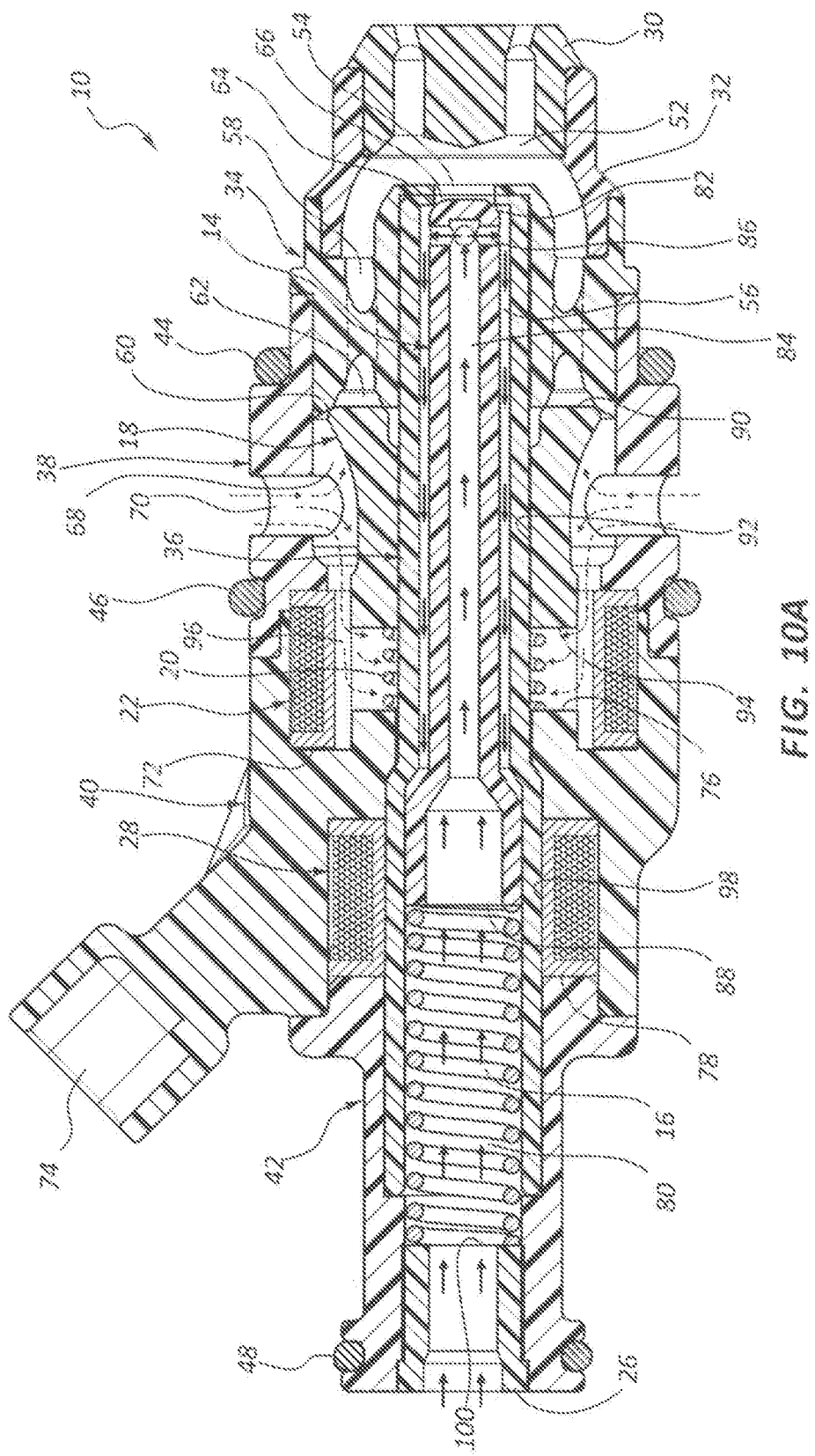
FIGS. 10A-10E are cross-sectional views showing operation of the fuel delivery device at FIG. 1 to control fuel and air flow through the fuel delivery device.
Figure 10B:
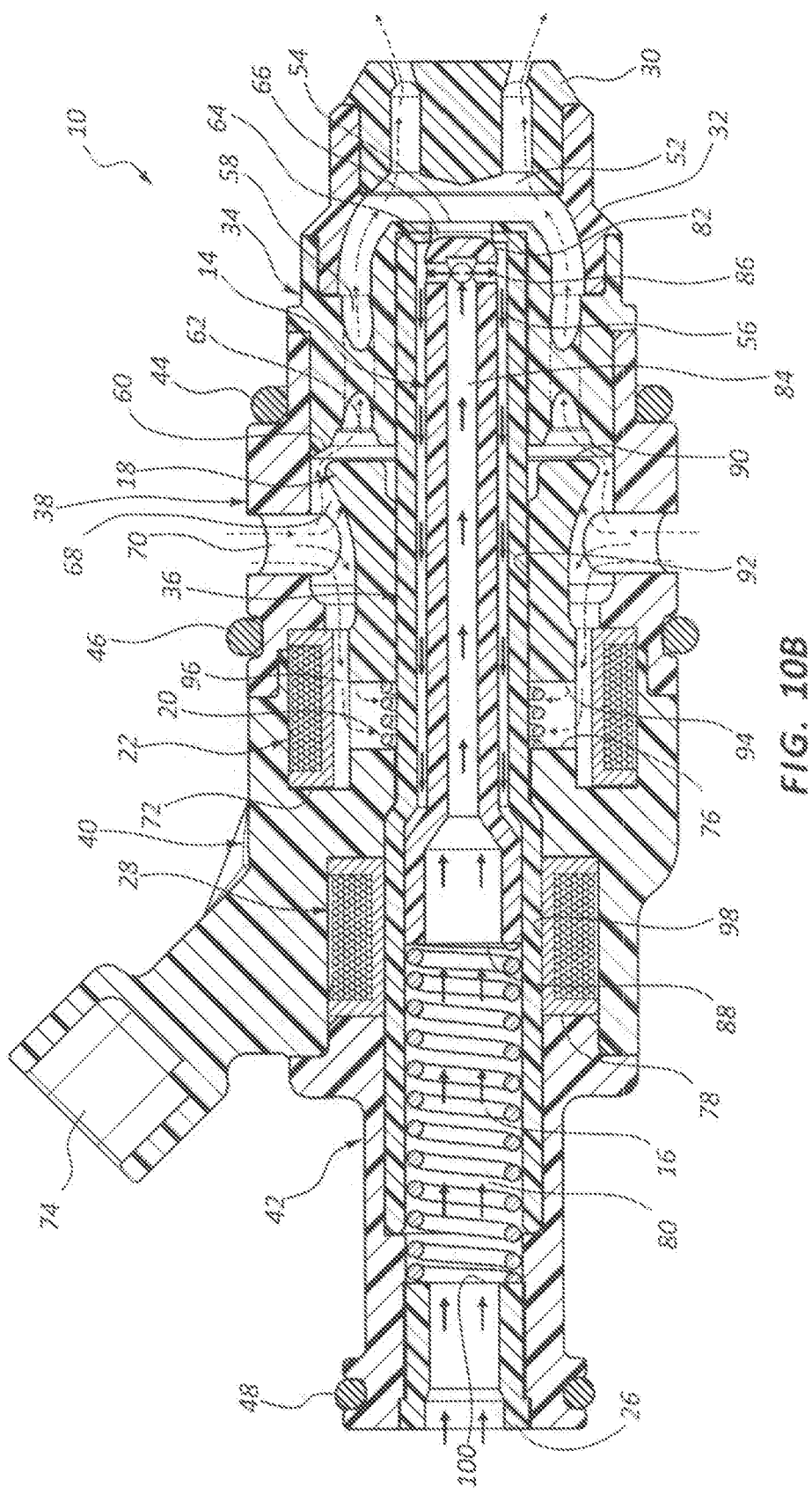

Referring now to FIGS. 10A-10E, an example fuel delivery sequence or fueling event is described. FIG. 10A shows the fuel plunger 14 and air plunger 18 in closed positions. The fuel spring 16 applies a biasing force to the fuel plunger 14 that holds the distal sealing surface 82 against the plunger seat 64 to prevent fluid flow into the mixing chamber 52. The air spring 20 applies a biasing force to the air plunger 18 to hold the distal sealing surface 90 against the air sealing seat 60, which prevents airflow into the mixing chamber 52.

The fueling sequence is initiated by activating the first solenoid 22, which generates a magnetic field that draws the air plunger 18 rearward against biasing forces of the air spring 20 to move the distal sealing surface 90 away from the air sealing seat 60. Air from the air cavity 68 travels through the air channels 58, into the mixing chamber 52, and out of the delivery tip 30. The air spring 20 is at least partially compressed when the air plunger 18 is retracted into the position shown in FIG. 10B.

Figure 10C:
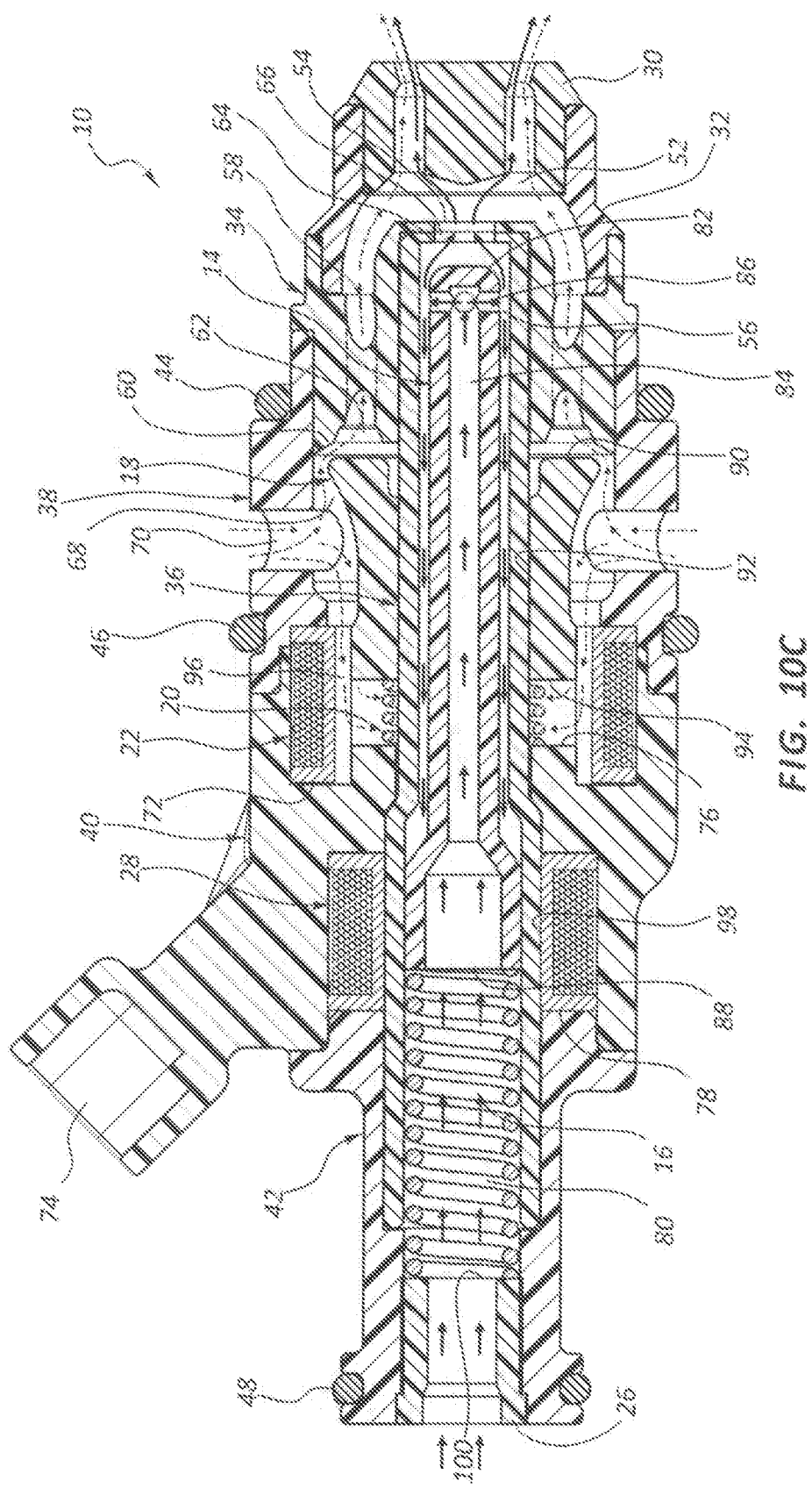

A further step in the fueling sequence may include activating the second solenoid 28, which creates a magnetic field that draws the fuel plunger 14 axially in a rearward direction against biasing forces of the fuel spring 16. Withdrawing the fuel plunger 14 as shown in FIG. 10C moves the distal sealing surface 82 away from the plunger seat 64 to permit fuel to flow from the fuel cavity 56, through the fuel aperture 66 and fuel aperture 54, and into the mixing chamber 52 to mix with the airflow. The fuel and air mix within the mixing chamber 52 and are delivered out of the delivery tip 30 for combustion within a combustion chamber of the IC engine.

Figure 10D:
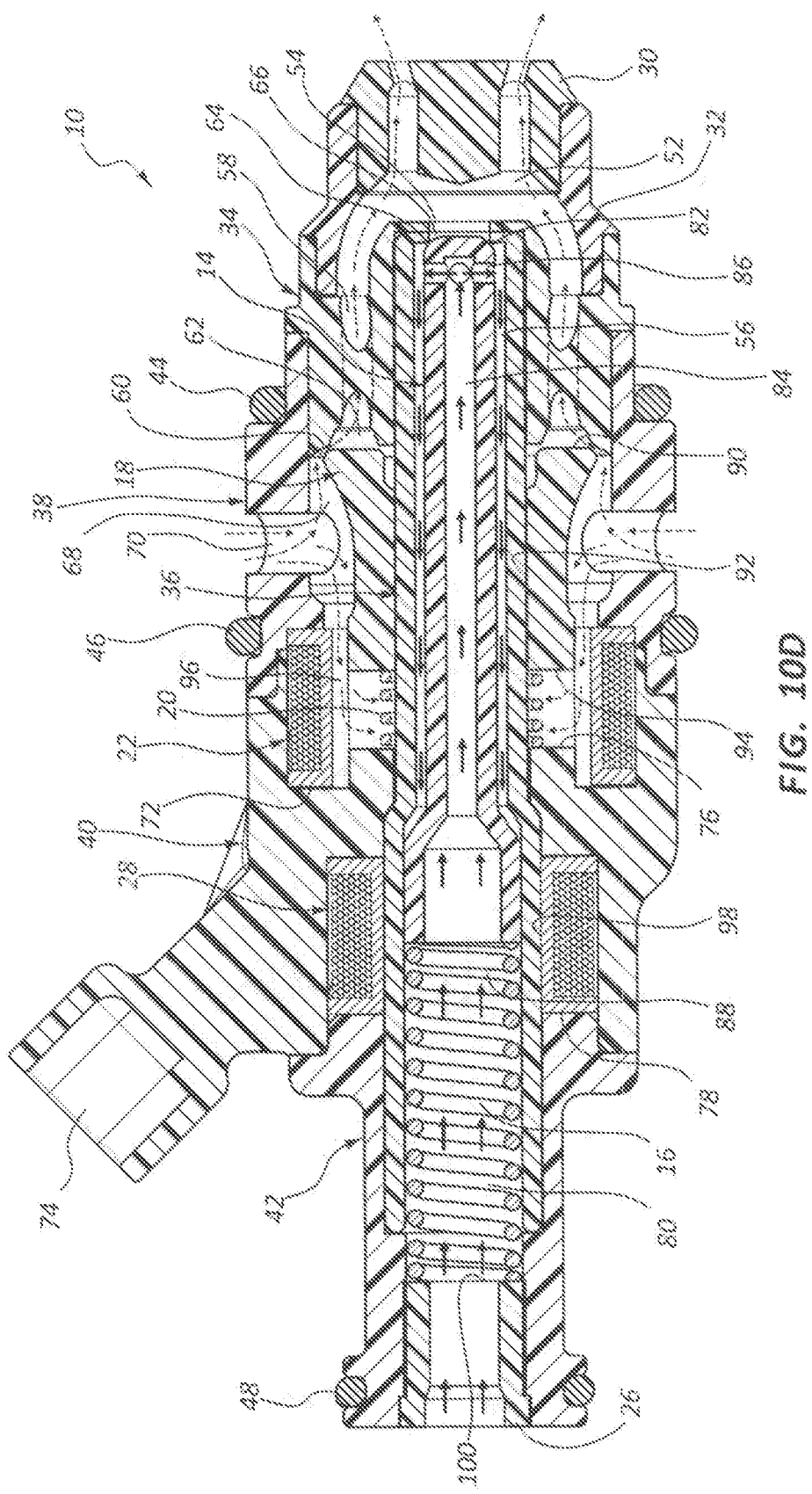

The second solenoid 28 is then deactivated to eliminate the magnetic field acting upon the fuel plunger 14. With the magnetic field removed, the fuel spring 16 applies its biasing force to the fuel plunger 14 to begin advancing the distal sealing surface 82 toward contact with the plunger seat 64 to stop fuel flow into the mixing chamber 52, as shown in FIG. 10D.

Figure 10E:
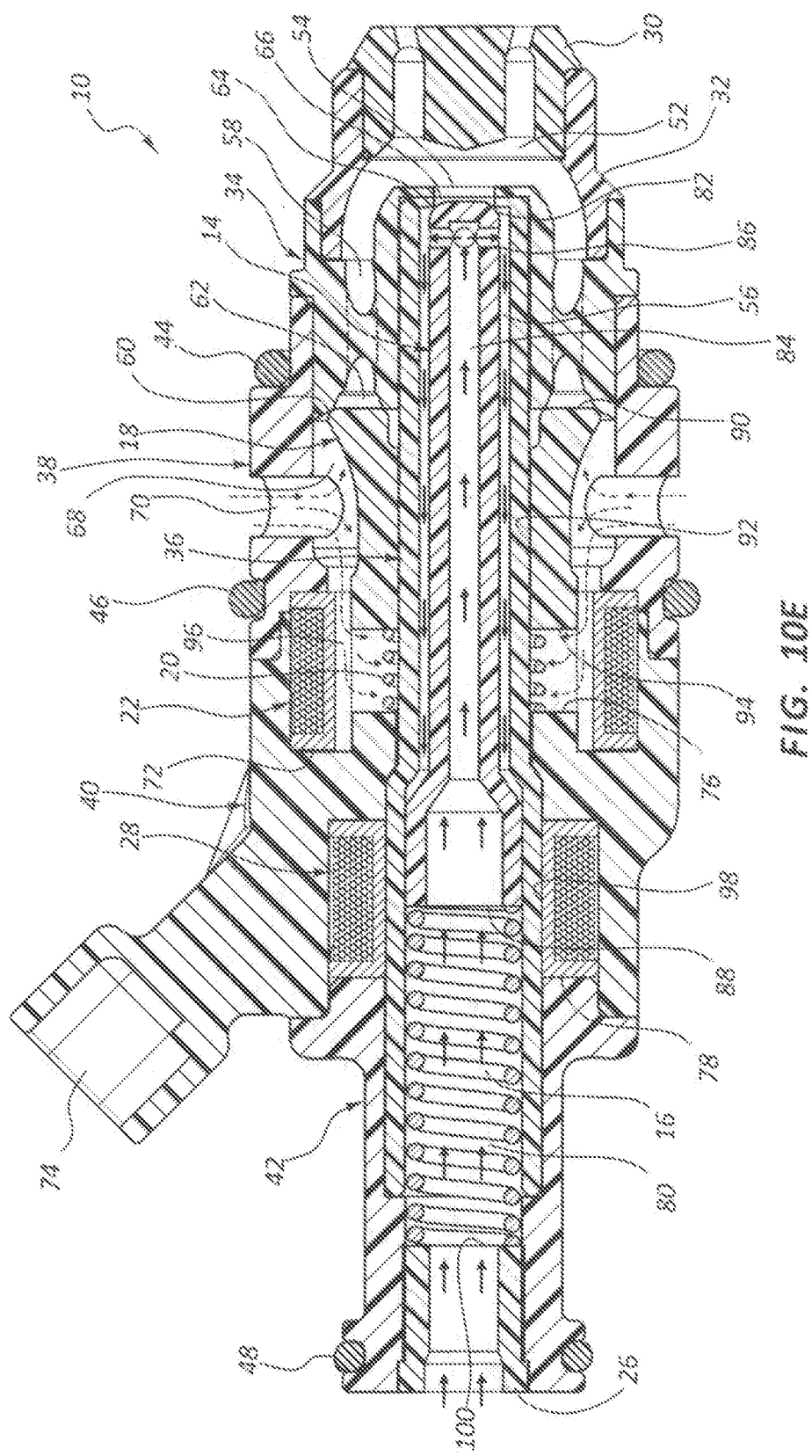

The airflow is stopped by deactivating the first solenoid 22, which eliminates the magnetic field acting on air plunger 18 and permits the air spring 20 to advance the distal sealing surface 90 of the air plunger 18 into contact with the air sealing seat 60 as shown in FIG. 10E. As discussed above, the delay between closing the fuel plunger 14 and closing the air plunger 18 permits the air flow to clear out fuel within the mixing chamber 52 and delivery tip 30. The equalized flow of air through the fuel delivery device 10 provided by the co-axial arrangement of air and fuel material features may provide improved clear out of fuel within the mixing chamber 52 and delivery tip 30.

The preceding description has been presented only to illustrate and describe certain aspects, embodiments, and examples of the principles claimed below. It is not intended to be exhaustive or to limit the described principles to any precise form disclosed. Many modifications and variations are possible in light of the above disclosure. Such modifications are contemplated by the inventor and within the scope of the claims. The scope of the principles described is defined by the following claims.

What is claimed is:

1. A metering system for a fluid atomizer, comprising:
   a housing having a first fluid inlet, a second fluid inlet, an outlet, a mixing chamber, a plurality of first fluid channels, and a flow channel provided between the first fluid inlet and the plurality of first fluid channels;
   a first plunger for controlling fluid flow, the first plunger comprising: a rearward most surface arranged away from the housing outlet and a forward most surface arranged toward the housing outlet wherein the first plunger is movable in the flow channel to control a flow of first fluid from the first fluid inlet to the plurality of first fluid channels;
   a second plunger for metering fluid, the second plunger having first and second portions, wherein the first portion of the second plunger is at a location rearward of the rearward most surface of the first plunger, wherein the second portion of the second plunger is at a location forward of the forward most surface of the first plunger, wherein the second plunger extends through the first plunger from the location rearward of the rearward most surface of the first plunger to the location forward of the forward most surface of the first plunger to deliver the second fluid through the first portion of the second plunger, at the location rearward of the rearward most surface of the first plunger, to the mixing chamber, and wherein the first portion of the second plunger, at the location rearward of the rearward most surface of the first plunger, is slidably movable relative to the rearward most surface of the first plunger;
   a first solenoid operable to move the first plunger between a closed position sealing the plurality of first fluid channels and an open position providing flow communication between the first fluid inlet and the plurality of first fluid channels; and
   a second solenoid operable to move the second plunger between a closed position and an open position providing flow communication between the second fluid inlet and the mixing chamber, the first plunger and the second plunger being movable independently relative to each other by operation of the first and second solenoids, respectively, and wherein the second solenoid is at a location rearward of the rearward most surface of the first plunger.

2. A metering system for a fluid atomizer, comprising:
   a housing having a first fluid inlet, a second fluid inlet, an outlet, a mixing chamber, a plurality of first fluid channels, and a flow channel provided between the first fluid inlet and the plurality of first fluid channels;
   a first fluid flow controller comprising: a rearward most surface arranged away from the housing outlet; and a forward most surface arranged toward the housing outlet; wherein the first fluid flow controller is movable in the flow channel to control a flow of first fluid from the first fluid inlet to the plurality of first fluid channels; and
   a second fluid metering device extending through the first fluid flow controller from a location rearward of the rearward most surface of the first fluid flow controller to a location forward of the forward most surface of the first fluid flow controller to deliver the second fluid from the location rearward of the rearward most surface of the first fluid flow controller to the mixing chamber, wherein the first fluid flow controller comprises a plurality of pins that move axially between a closed position sealing the plurality of first fluid channels and an open position providing flow communication between the first fluid inlet and the plurality of first fluid channels.

3. The metering system of claim 1, wherein the plurality of first fluid channels are angled radially inward at an angle relative to a longitudinal axis of the metering system.

4. The metering system of claim 1, wherein the second plunger is arranged radially inward from and coaxially with the first plunger.

5. The metering system of claim 1, wherein the plurality of first fluid channels are spaced apart circumferentially and angled in at least one of a radially inward direction and a tangential direction to create a swirl of the flow of first fluid in the mixing chamber.

6. The metering system of claim 1, wherein the plurality of first fluid channels are angled tangentially relative to a longitudinal axis of the metering system.

7. The metering system of claim 1, wherein the plurality of first fluid channels comprises at least 10 channels.

8. A method of operating a fluid atomizer, comprising:
providing a first plunger for metering fluid, a second plunger for metering fluid, a mixing chamber, a first fluid inlet, and a plurality of first fluid channels positioned between the mixing chamber and the first fluid inlet, wherein the second plunger extends through the first plunger, and wherein the second plunger extends from a front end to a rear end of the first plunger;
moving the first plunger to control a first fluid flow through the plurality of first fluid channels to the mixing chamber to create a flow of first fluid into the mixing chamber;

moving the second plunger independent of movement of the first plunger to control a second fluid flow from an aperture, into the mixing chamber, and onto a conical pedestal, independent of the flow of the first fluid into the mixing chamber, to create a mixture of the first fluid and the second fluid in the mixing chamber, the flow of the second fluid being delivered from a location rearward of the first plunger to the mixing chamber, and wherein the mixing chamber is located between the aperture and the conical pedestal; and dispensing the mixture out of the fluid atomizer.

9. The method of claim 8, further comprising providing a first solenoid and operating the first solenoid to move the first plunger relative to the plurality of first fluid channels.

10. The method of claim 9, further comprising providing a second solenoid and operating the second solenoid to move the second plunger relative to the first plunger.

11. A method of operating a fluid atomizer, comprising:

providing a first fluid metering device, a second fluid metering device, a mixing chamber, a first fluid inlet, and a plurality of first fluid channels positioned between the mixing chamber and the first fluid inlet, the second fluid metering device extending from a front end to a rear end of the first fluid metering device;

moving the first fluid metering device to control a first fluid flow through the plurality of first fluid channels to the mixing chamber to create a flow of first fluid into the mixing chamber; and moving the second fluid metering device independent of movement of the first fluid metering device to control a second fluid flow to the mixing chamber to create a mixture of the first fluid and the second fluid in the mixing chamber, the flow of the second fluid being delivered from a location rearward of the first fluid metering device to the mixing chamber; and dispensing the mixture out of the fluid atomizer, wherein the first fluid metering device includes a plurality of pins arranged adjacent to the plurality of first fluid channels, and moving the first fluid metering device includes moving the plurality of pins relative to the plurality of first fluid channels.

12. The method of claim 8, wherein the plurality of first fluid channels are arranged circumferentially spaced apart and are angled in at least one of a radial direction and a tangential direction, the method further comprising providing a swirl flow in the mixing chamber with the plurality of first fluid channels.

13. A fluid mixing device, comprising:

a mixing chamber;

at least two first fluid inlets;

a first plunger for metering fluid, the first plunger being axially movable to control delivery of a first fluid from the at least two first fluid inlets to the mixing chamber;

a second plunger for metering fluid, the second plunger extending through the first plunger from a front end to a rear end of the first plunger and configured to deliver a second fluid through the second plunger from a location within the second plunger, and rearward of the first plunger, to the mixing chamber at a location forward of the first plunger, and wherein a portion of the second plunger, at the location rearward of the first plunger, is slidably movable relative to the first plunger;

a first fluid chamber positioned between the at least two first fluid inlets and the mixing chamber, and the first plunger is movable axially within the first fluid chamber to control a flow of the first fluid to the mixing chamber; and a plurality of circumferentially spaced apart channels arranged between the first fluid chamber and the mixing chamber, and the first plunger is operable to control the flow of the first fluid into the plurality of circumferentially spaced apart channels.

14. The fluid mixing device of claim 13, further comprising at least four supply ducts arranged at equally spaced apart circumferential locations.

15. The fluid mixing device of claim 13, wherein the first plunger is coextensive with the second plunger along an entire length of the first plunger.

16. The fluid mixing device of claim 13, wherein the first and second plungers are movable independent of each other.

* * * * *